Figure 1:
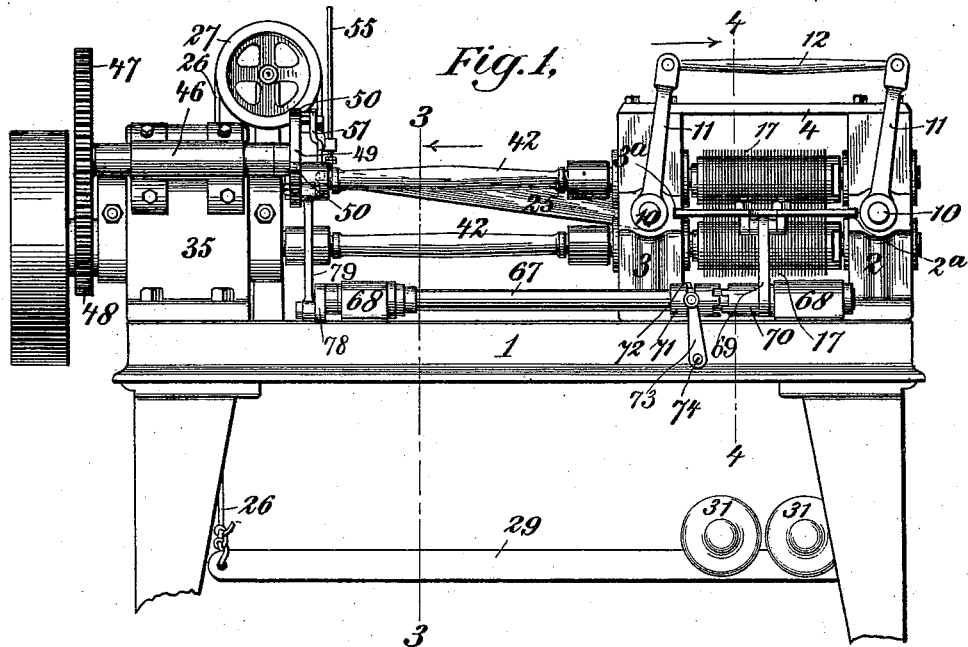

(No Model.)  3 Sheets—Sheet 1.

A. F. MADDEN.
BATTERY GRID AND MACHINE FOR PRODUCING SAME.

No. 572,363.  Patented Dec. 1, 1896.

WITNESSES:  INVENTOR
Albert F. Madden
BY
ATTORNEYS (No Model.) 3 Sheets—Sheet 2.
A. F. MADDEN.
BATTERY GRID AND MACHINE FOR PRODUCING SAME.
No. 572,363. Patented Dec. 1, 1896.
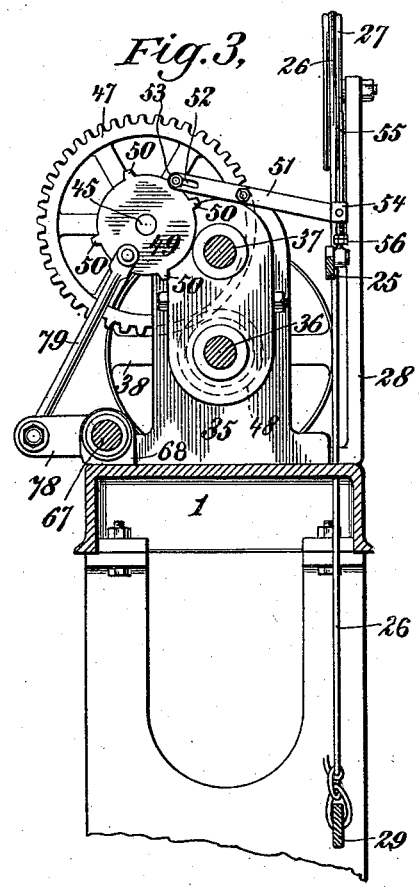
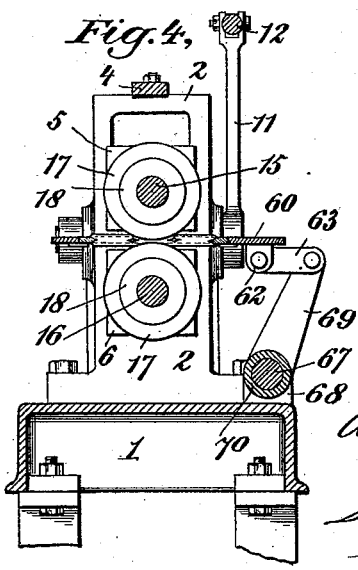

(No Model.) 3 Sheets—Sheet 3.

A. F. MADDEN.
BATTERY GRID AND MACHINE FOR PRODUCING SAME.

No. 572,363. Patented Dec. 1, 1896.

WITNESSES:
D. H. Haymood
Wm. E. Knight.

INVENTOR
Albert F. Madden
BY
Knight Bros
ATTORNEYS

UNITED STATES PATENT OFFICE.

ALBERT F. MADDEN, OF NEWARK, NEW JERSEY, ASSIGNOR TO ABRAM VAN WINKLE AND RUFUS N. CHAMBERLAIN, OF SAME PLACE.

BATTERY-GRID AND MACHINE FOR PRODUCING SAME.

SPECIFICATION forming part of Letters Patent No. 572,363, dated December 1, 1896.

Application filed November 19, 1895. Serial No. 569,406. (No model.)

*To all whom it may concern:*

Be it known that I, ALBERT F. MADDEN, a citizen of the United States, residing at Newark, in the county of Essex and State of New Jersey, have invented certain new and useful Improvements in Battery-Grids and Machines for Producing the Same, of which the following is a specification.

In the art of making secondary batteries many difficulties have arisen from the material used in their composition, due particularly to the construction or formation of the supporting conductors or grids. The methods now commonly employed in the manufacture of secondary-battery elements are casting the plate or grid by the simple means of pouring lead or other substance into a mold from a ladle or subjecting it to pressure, either hydrostatic or by means of a roller.

I have found after careful experiment that the use of the hydrostatic or roller pressure is prohibitory, owing to the cost of the necessary apparatus. I have also found that cast-lead is porous and unsuitable for batteries of the electrochemical type, because the chemicals used in producing the peroxid of lead from the lead will enter the small pores of the casting and will corrode and expand and distort the plate and it will be impossible to obtain uniform results from any two castings. It is a very desirable feature with secondary batteries to have both elements with the same amount of active material produced upon them; but when a plate is cast this cannot be accomplished, because one offers a larger surface to the action of the chemical than another does, although both may have been cast in the same mold. It is therefore apparent that the nature of the lead is such that it requires a rolling or working together of the molecules to produce a uniformity of molecular structure.

I have constructed and patented several machines for the manufacture of secondary-battery grids, and I have found it impossible to obtain the desired result by the methods of rolling semifluid lead or by casting lead in any form. Lead plates have also been formed of ribbons made by hydraulic pressure or rolling and having their ends bound together by fusion. This form of plate has not given satisfaction, because the lead so made has been too expensive for general use.

The object of my invention therefore is to make a secondary-battery plate or grid with shelves or partitions which will have a molecular structure of uniform density throughout and at the same time offer the largest possible surface for chemical or electrochemical action, and will be cheap to manufacture. To this end I first produce a lead blank of any suitable or desired shape and subject it to the spinning action of the rollers provided with cutting-disks, which I will hereinafter fully describe. By subjecting the plate of lead or other flexible metal adapted for secondary batteries to the spinning action of the series of metallic disks the molecular structure and density of the shelves or partitions are rendered absolutely uniform throughout, while the integral supporting-frame surrounding the shelves is of a different density, (less dense than the spun shelves,) and I thereby secure a supporting structure or grid that can be relied upon when subjected to the chemical or electrochemical action for producing the active material.

For the purpose of spinning my improved battery plates or grids I have invented a machine consisting, essentially, of a pair of cooperating rolls provided with cutting-disks, a frame supported between the rolls and adapted to support the blank plate in position to be operated upon by the cutting-disks, and suitable means for operating the cutters and carrying-frame. I preferably arrange means for adjusting the action of the cutters, and for the purpose of making grids with transverse solid strengthening-bars I provide an automatic device for separating the cutters more or less at intervals during the cutting operation. The cutters are preferably held to their work by a yielding pressure.

In order that my invention may be fully understood, I will first describe the same with reference to the accompanying drawings, and then point out the novelty with more particularity in the annexed claims.

Figure 2:
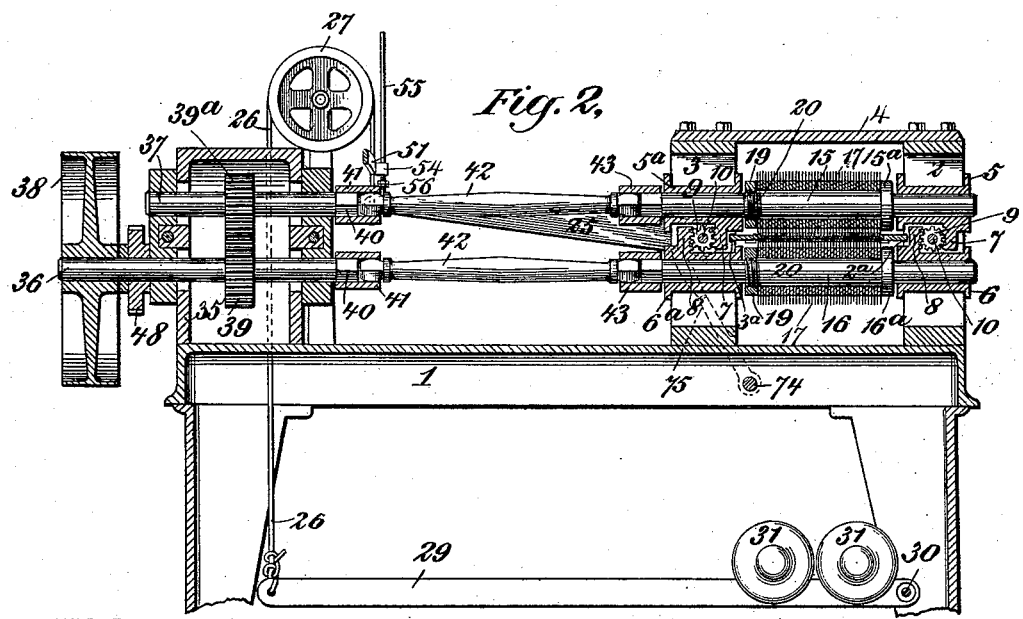
Figure 5:
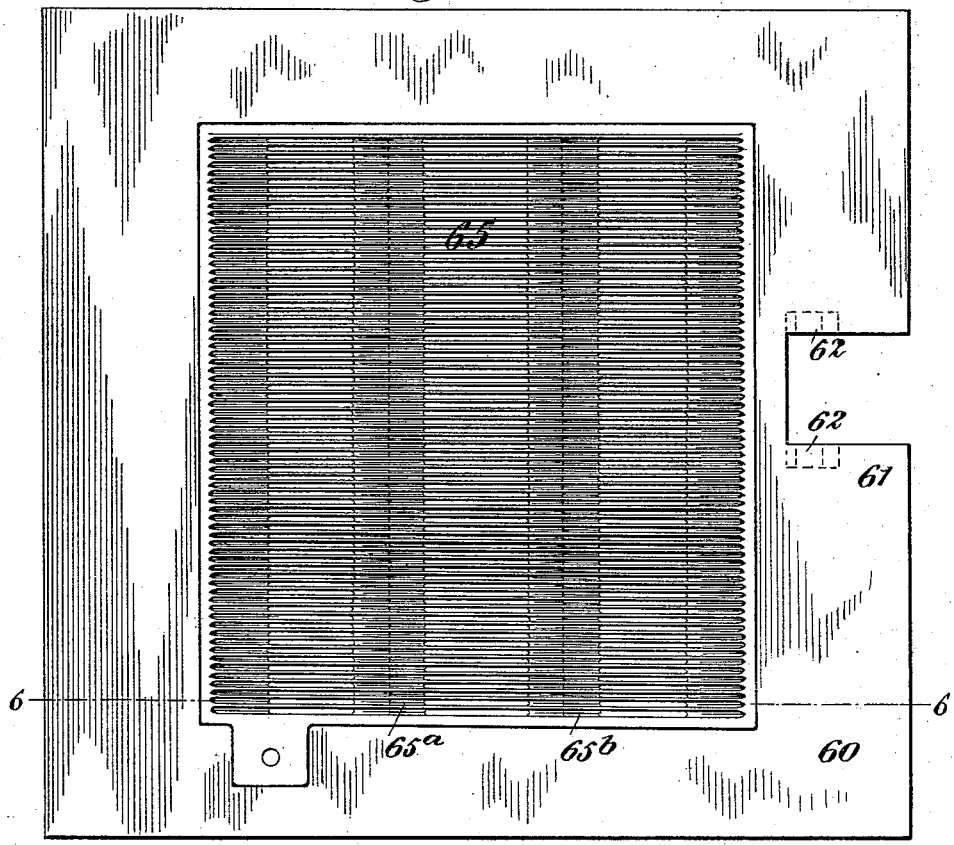
Figure 6:
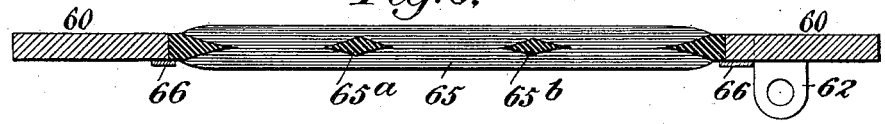
Figure 7:
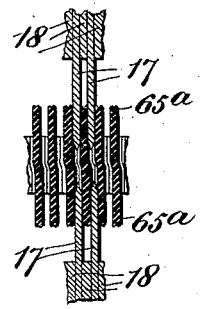

In said drawings, Figure 1 is a front elevation of my improved machine. Fig. 2 is a central longitudinal sectional elevation of the same. Fig. 3 is a transverse sectional view taken on the line 3 3 of Fig. 1. Fig. 4 is a transverse sectional view taken on the line 4 4 of Fig. 1. Fig. 5 is a plan view of the plate-carrying frame with a completed grid in place therein. Fig. 6 is a sectional view of the same, taken on the line 6 6 of Fig. 5. Fig. 7 is an enlarged detail sectional view illustrating two pairs of cutting-disks at work upon a blank.

1 is the main supporting-frame of any suitable construction.

2 and 3 are the upright oblong standards mounted upon the main frame 1 adjacent to one end and rigidly braced together by the bar 4. The standards 2 and 3 have oblong openings or guideways formed in them, in which are mounted the vertically-sliding and adjustable journal-boxes 5, $5^a$, 6, and $6^a$. The upper boxes 5 and $5^a$ are formed with downwardly-projecting toothed lugs or projections 7, while the lower boxes 6 and $6^a$ are formed with similar upwardly-projecting toothed lugs or projections 8.

9 are cog-gears keyed upon the parallel rock-shafts 10, which are journaled in the standards 2 and 3.

The gears 9 engage the teeth of the projections 7 and 8 and in rotating tend to draw the journal-boxes together or force them apart. Keyed to the outer end of each of the rock-shafts 10 is a rock-arm 11, and connected to rock-arms 11 is a bar 12, which is pivoted to the upper end of each rock-arm.

15 and 16 are shafts journaled in the journal-boxes 5, $5^a$, 6, and $6^a$ and having mounted upon them the spinning-rollers, which are formed of a series of cutting-disks 17 and intervening washers 18. Each of the shafts is formed with a collar $15^a$ or $16^a$, against which the cutting-disks 17 and washers 18 are arranged and clamped in position by means of the threaded nuts 19, operating upon a threaded portion 20 of each shaft. I prefer to make the cutting-disks 17 about one inch larger in radius than the intervening washers. The washers form a division between each pair of cutting-disks for the purpose which will presently appear.

25 is a long lever keyed to one end of a rock-shaft 10 and having attached to its free end a cord or wire 26, which passes through a grooved pulley 27, journaled in the upper end of a bar 28, extending up from the main frame. The other end of the cord or wire 26 is attached to a lever 29, which is pivoted at 30 to the main frame 1.

31 are grooved weights mounted upon the lever 29 and adapted to be rolled or adjusted to any desired point upon said lever to regulate the pressure thereupon to suit. The pressure upon the lever 29 is exerted through the cord 26 upon the controlling-lever 25, which rocks the shafts 10 and through pinions 9 presses the journal-boxes and spinning-rolls together with a yielding pressure.

35 is an auxiliary frame upon the opposite end of the main frame and having journals for the main power-shaft 36 and auxiliary power-shaft 37, the shaft 36 having keyed upon it the driving-pulley 38 and a cog-gear 39, which gears with a similar gear $39^a$, keyed to the shaft 37, so that the shafts will be driven in opposite directions and at the same speed. The inner end of each of the shafts 36 and 37 is squared at 40 for the reception of the coupling or collar 41, which engages the longitudinally-rounded squared ends of the coupling-shafts 42. The shafts 42 have their opposite ends similarly shaped to engage in collars 43, which are squared upon the projecting squared ends of the roll-shafts 15 and 16. By this means the spinning-rolls are driven in opposite directions and at the same rate of speed, while at the same time they are allowed to move toward and from each other.

45 is a short shaft journaled in the bearing 46 of the auxiliary frame 35 and having keyed to its outer end a large gear-wheel 47, which meshes with a similar gear 48. Mounted upon the inner end of the shaft 45 is a crank wheel or disk 49, which is formed with cam-teeth 50. Pivoted to a suitable support extending up from the auxiliary frame 35 is a short lever 51, formed with a slot 52 at one end, in which is adjustably mounted a tooth 53, which is supported in the path of the cam-teeth 50. Upon the opposite end of the lever 51 is mounted a block 54, through which loosely passes a vertically-extending rod 55, which is pivoted to the lever 25, adjacent to its end. The rod 55 has mounted upon it near its pivot adjustable nuts 56, which operate upon a threaded portion of the rod 55. The purpose of this arrangement is to intermittently separate the spinning-rolls. In the rotation of the crank-disk 49 the cam-teeth 50 come in contact with the finger 53 and rock the lever 51 upon its pivot and cause the block 54 to engage the nuts 56 and thereby depress the controlling crank-lever 25, which will rotate the gears 9 and move the spinning-rolls apart for an instant.

60 is a rectangular frame formed with a cut-out portion 61 and depending perforated lugs 62, between which the link 63 is pivoted. The rectangular frame 60 is formed with a rectangular opening of the proper size and shape to receive a blank plate for the formation of the secondary-battery grid.

65 represents a grid supported in the frame 60 and prepared by my machine.

66 are lugs formed on the frame 60 at the edges of the rectangular opening for the reception of the blank for the purpose of engaging the edges of the blank and supporting it in the frame.

67 is a rock-shaft suitably journaled upon the main frame in bearings 68 and having a crank-arm 69 loosely journaled upon it. The crank-arm 69 is pivoted at its upper end to the link 63.

70 is one member of a clutch attached to the crank-arm 69 and loose on the shaft 67, and 71 is the other member of the clutch, splined to the shaft 67 and formed with an annular groove 72, in which engages the rock-arm 73, keyed to the shaft 74, which extends across the machine and is provided at its opposite end with an operating hand-lever 75. (Indicated in dotted lines in Fig. 2.) By the movement of the lever 75 the clutch can be thrown into and out of gear, so that the rocking of the shaft 67 will reciprocate the rectangular frame 60 in the guide-grooves $2^a$ and $3^a$, formed in the inner faces of the standards 2 and 3.

78 is a crank-arm keyed to the opposite end of shaft 67, and 79 is a link connecting said crank-arm and the disk 49, by means of which the shaft 67 is rocked in its bearings.

In the operation of the machine a blank is placed in the rectangular frame 60 and the machine started. As soon as the spinning-rolls have become started the clutch 70 71 is thrown into gear and the plate 60 will be slowly moved in between the spinning-rolls, causing them to cut into the blank and spin the shelves or partitions upon the plate. At suitable intervals the automatic device will move the rolls apart for the purpose of leaving transverse ribs or bars of solid metal in the grid. In the grid 65 (shown in the drawings) $65^a$ are the shelves or partitions, and $65^b$ are the solid transverse ribs or bars. It is preferable to have the spinning-rolls so adjusted that they will cut completely through the blank.

The automatic weighted device for holding the spinning-rolls to their work gives them sufficient pressure to cut into the blank, which enables them to be forced apart should they meet any obstruction in the blank, thereby avoiding danger of injuring the machine.

The automatically-operating weights and levers draw the upper and lower series of cutting-disks (constituting the spinning-rolls) together under any desired pressure toward a central line to act upon both sides of the slab or blank of any suitable material—such, for instance, as cast or rolled lead—which is supported in the carrier in the central line between the rolls. The adjustable weights, operating through the levers, not only regulate the cutting action of the machine, but they also regulate the amount of heat generated by the rotation of the cutting-disks upon the lead as the latter is moved to and fro between the rolls.

The spinning-rolls are preferably arranged to entirely perforate the plates between the strengthening-bars, as shown in the drawings. These bars give sufficient strength to the grid when thus perforated to prevent their being torn asunder during manufacture, and also stiffen them sufficiently to prevent buckling or undue expansion when in use.

The automatic lever-pressure regulative device is quite important in manipulating the spinning-rolls as they are brought into and out of contact with the lead slab. It will be noticed that as the spinning-disks penetrate the lead they elongate the slots or channels. If the rolls were forced down into the lead by positive means, such as by key or wedge, at the end of each stroke a solid mass of lead will come into contact with the disks and thereby strain the machine and distort the plate. As a safeguard against such accident the automatic pressure device, which is controlled by the adjustable weight, keeps a uniform yielding strain constantly upon the grid at all times. Another advantage of the regulating-lever motion is that when the disks are being buried into the plate the stroke of the reciprocating slide or carriage is not interfered with.

One of the most important features in this machine is the heat generated during the period that the spinning-rolls are working in contact with the lead. It is well known that when lead is heated to a temperature of from 200° to 300° centigrade it requires very little strain or pressure to cut or bend it or in fact to work it in any form, and this one feature occurs to such an extent that it makes the machine operate rapidly, because when the spinning-rolls are once brought up to their proper temperature they retain the heat and thereby produce the spinning action more easily than is generally supposed.

The result of my improved process is the production of a grid formed of a series of layers or shelves of spun or wrought lead, preferably with elongated perforations or slots between them, and supported at the sides, and preferably at intermediate portions also, by ribs or bars of solid lead. Such a plate has all the advantages known to inhere in a wrought-lead grid with none of the disadvantages ordinarily attached to the forms of such grids hitherto known, being all in one-piece joints, and imperfections of joints ordinarily present in wrought-metal grids are done away with and the whole mass of the grid is homogeneous. If the blank used is of cast lead, the imperfections of the casting are removed by the spinning process and all the mass turned into one uniform structure, and, to a less marked extent, the same changes take place even if the blank employed is of rolled lead. The number of shelves or layers of the metal may be made as great as desired, the shelves themselves and the spaces, that is, the interstices or slots between them, being capable of being made of greater or less width, as may be desired. The surface may be thus cut up to such an extent as to give to the plate formed on this grid a uniformity and even distribution of action not hitherto obtainable.

The size and design of the grid may be varied as desired not only by increasing or decreasing the number of spun parts by adding to or reducing the number of spinning-disks, but the number and direction of the strengthening-bars or unspun parts of the grid may be altered, and such bars may be not only formed in direction transverse to the shelves or the line of movement of the plate through the machine, but parallel therewith, if desired, this being especially preferred on large grids. To this end the number of disks on the pairs of spinning-rolls may be altered as circumstances may require by simply inserting additional washers on the rolls at intervals to take the place of the disks removed, or by employing spinning-rolls of larger or smaller size. A space formed by several washers will form a strengthening-bar parallel with the shelves.

While this spun plate or grid is especially adapted for use in the electrical or electrochemical process of forming, it is also capable of being used with processes in which the active matter is mechanically applied. It will be observed from the drawings that in the process of spinning the surfaces of shelves or divisions are expanded beyond the surface of the blank, and in practice, as I have operated the invention, the displacement of the lead is equivalent to the thickness of the original, so that the shelves or the divisions are of double the width of the surrounding frame, but of course these proportions may be varied and the quantity of lead spun out into the expanded shelves or divisions may be varied as required. The shelves and grooves being perfectly parallel, the action of the plate will be uniform throughout.

I have found in practice that it has been necessary to give eight revolutions of the spinning-rolls to one stroke of the plate.

The battery-grid defined as comprising suitable shelves or partitions and a supporting-frame formed of an integral piece of lead, with the shelves or partitions of uniform density throughout and of different density from the supporting-frame, is a spun-metal grid such as is produced by my improved grid-spinning machine from a blank of rolled or cast lead, the shelves or partitions being spun to a greater density than the surrounding frames and of substantially uniform density throughout.

Having thus described my invention, the following is what I claim as new therein and desire to secure by Letters Patent:

1. A battery-grid having shelves or partitions and a suitable supporting-frame formed of an integral piece of lead, the shelves or partitions being of uniform density throughout and of different density from the supporting-frame, substantially as set forth.

2. In a machine for making battery-grids, the combination of a pair of spinning-rolls provided with parallel spinning-knives, means for rotating the spinning-rolls in proper relation to each other, means for supporting a blank plate, and means for feeding the plate-support between the rolls independent of the rolls, substantially as set forth.

3. In a machine for making battery-grids, the combination of the paired spinning-rolls, means for driving the same, a reciprocating support adapted to receive the blank plate and move back and forth between the spinning-rolls, and means for holding the rolls to their work with a yielding pressure, substantially as set forth.

4. In a machine for making battery-grids, the combination of suitable devices adapted to spin shelves or partitions upon a blank, with means for supporting the blank in proper relation to the spinning devices, and means for driving the spinning devices at a greater rate of speed than the blank supporting and feeding devices, substantially as set forth.

5. In a machine for making battery-grids, the combination of the adjustable spinning-rolls, means for driving the same, a plate-supporting device, and means independent of the spinning-rolls for feeding the plate-supporting device, substantially as set forth.

6. In a machine for making battery-grids the combination of means for feeding a battery-grid therethrough, spinning-rolls, and means for driving said rolls at greater speed than the feeding mechanism, as set forth.

7. In a machine for making battery-grids, the combination of the pair of adjustable spinning-rolls, means for driving them, means for holding them to their work with a yielding pressure, means for intermittently moving the rolls from their work, and means for supporting and feeding a blank, as set forth.

8. In a machine for making battery-grids, the combination of a suitable frame, the vertically-movable journal-boxes supported in said frame, the spinning-rolls journaled in said boxes, means for rotating them, the toothed lugs or projections on the journal-boxes, pinions engaging the teeth of said lugs, rock-shafts upon which said pinions are mounted, means for coupling said rock-shafts together, and means for exerting a yielding pressure thereupon, as set forth.

9. In a machine for making battery-grids the combination of the suitable frame, the vertically-movable journal-boxes supported therein and formed with toothed lugs or projections, rock-shafts carrying pinions which engage the teeth of said lugs or projections, rock-arms keyed to said rock-shaft and connected by a rod, a lever connected to one of said rock-shafts, an adjustable weight-lever, and suitable means connecting said levers, as set forth.

10. In a machine for making battery-grids, the combination of the adjustable spinning-rolls, means for holding the rolls to their work with a yielding pressure, a lever connected therewith, a toothed wheel intermittently engaging said lever for withdrawing the rolls, and means for supporting and feeding a plate, as set forth.

11. In a machine for spinning battery-grids, the combination of a pair of spinning-rolls, a blank-supporting frame having an opening for the reception of the blank and means for supporting the blank therein, means for reciprocating said frame between the rolls, and means for operating the rolls, as set forth.

12. In a machine for spinning battery-grids, the combination of the frame-standards, the spinning-rolls adjustably journaled therein, the transverse guide-grooves, the sliding frame supported in the guide-groove and provided with means for supporting a blank, and means for operating said sliding frame, as set forth.

ALBERT F. MADDEN.

Witnesses:
M. V. BIDGOOD,
HARRY E. KNIGHT.